United States Patent [19]
Way

[11] 4,274,219
[45] Jun. 23, 1981

[54] AUTOMATIC POWER FISHING REEL
[76] Inventor: Merton B. Way, 5300 John R. Rd., Troy, Mich. 48098
[21] Appl. No.: 930,817
[22] Filed: Aug. 3, 1978
[51] Int. Cl.³ .......................................... A01K 87/04
[52] U.S. Cl. .................................. 43/27.2; 43/43.12; 242/84.1 A
[58] Field of Search ................ 43/21, 24, 27.4, 43.12, 43/21.2, 27.2, 26.1, 26.2; 242/84.1 A, 84.1 M, 84.5 R, 99, 106

[56] References Cited
U.S. PATENT DOCUMENTS

| 3,835,571 | 9/1974 | Berry | 43/21 |
| 3,977,118 | 8/1976 | Seymour | 242/84.5 R |
| 4,037,326 | 7/1977 | Booth | 242/84.1 A |

FOREIGN PATENT DOCUMENTS
445943  1/1948  Canada ........................................ 43/21

Primary Examiner—Othell M. Simpson
Assistant Examiner—Roscoe V. Parker
Attorney, Agent, or Firm—Gerald R. Hershberger

[57] ABSTRACT

A trolling tackle device having a reversible power drive reel for raising and lowering a metal line and a heavy sinker in deep water trolling. A fishing line, bait and hooks are releasably attached adjacent the sinker and are thus to be lowered to the desired depth and are arranged to separate from the sinker line when a fish takes the bait. The drive is controlled by a switch so that when the sinker and tackle reach the desired depth, the switch is automatically opened and the reel is stopped with the tackle at a predetermined depth. When a fish is caught the fisherman throws the switch and the sinker line and sinker are pulled up by the power reel, preventing fouling of the lines by the action of the fish.

When the sinker reaches the desired height the switch is automatically opened and the sinker held at a predetermined height. The automatic stopping of the reel allows the fisherman to place the bait at the same depth each time the fishing line is reeled in, and allows him freedom to play the fish when the sinker is raised without concern as to the need to manually stop the reel when the sinker reaches the boat. A rheostat is placed in circuit relationship with the power reel so that the speed of the motor can be regulated in its downward descent.

3 Claims, 8 Drawing Figures

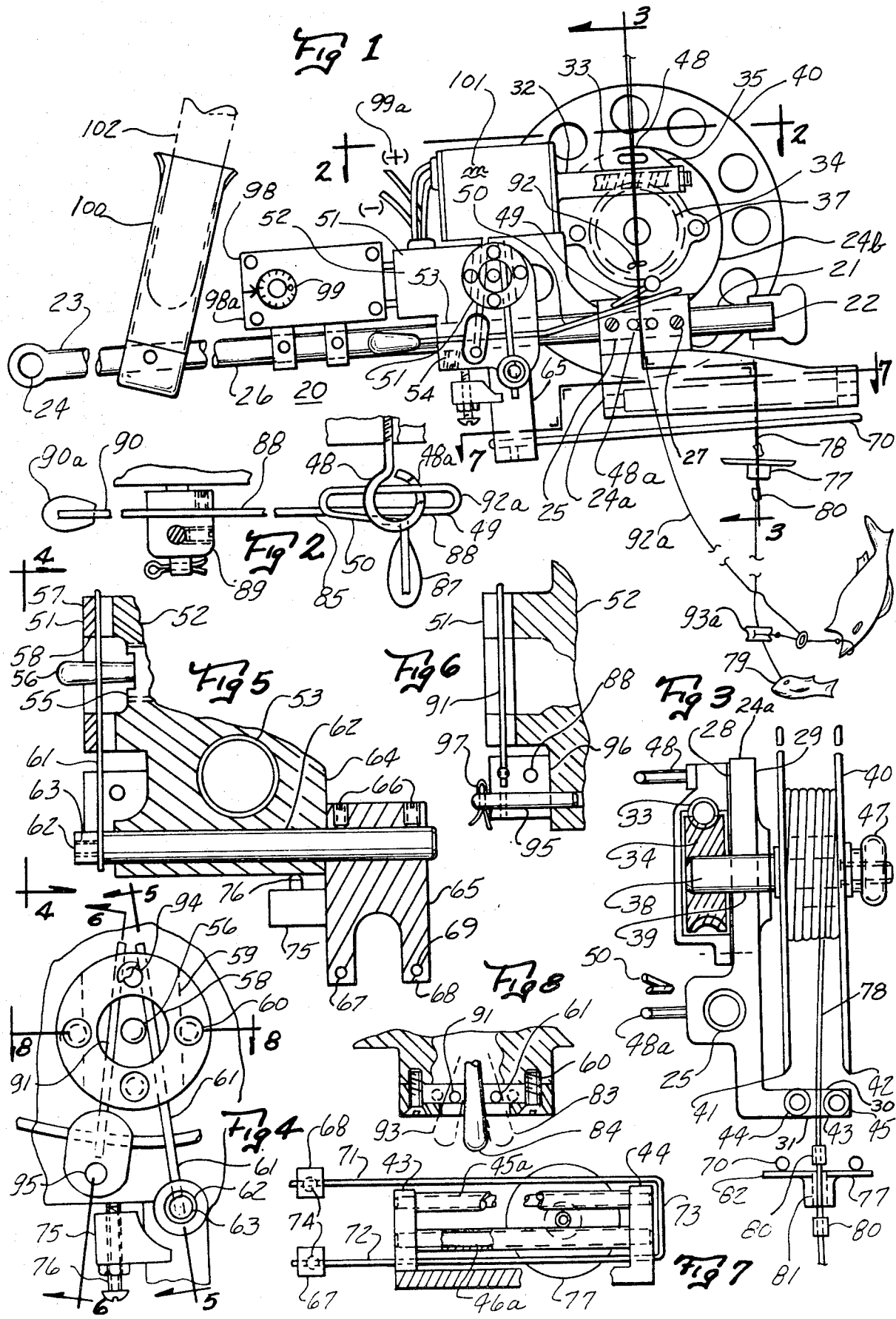

AUTOMATIC POWER FISHING REEL

BACKGROUND OF THE INVENTION

Field of the Invention

When deep-water trolling for lake trout, coho salmon, and other fish it is necessary to use a metal sinker line and a heavy sinker to sink the fishing line and lure to the desired depth of 100-300 feet. The fisherman thus plays both the sinker line and the fish line at the same time to lower the sinker, and the lure or bait to the desired depth. He then secures the line, trolls the bait or lure, and watches the angle of the fish line. Upon the angle of the fish line changing, the indicator is that a fish has pulled the line free of the sinker line. At this point it is necessary to raise the metal line and weights quickly to prevent the fish circling and fouling the lines. At this point it is also necessary to man the fish pole and reel to set the hooks and play the fish. The fisherman finds that he is handicapped in manning either line by the presence of the other and he cannot do both jobs properly at the same time with a heavy metal sinker line and sinker on one reel and a heavy fish on the fish line and reel. Power reels are employed to lift the metal line and sinker but operation of these divert the fisherman from playing the fish. It is also customary to place the metal sinker reel on the boat with an outrigger having a pully at its tip for suspending the metal line over the side of the boat.

SUMMARY OF THE INVENTION

It is the purpose of the present invention to eliminate the necessity of pulleys on the outward end of the downrigger by placing the sinker reel at such end and mounting the opposite end on a boat, and to provide automatic up and down control of the reel. An object of this invention is to provide a power operated reel means for a sinker line and sinker so that the fisherman can automatically stop the sinker when it is raised clear of the fish line.

An object of this invention is to provide a power operated reel means for a sinker line, sinker, fish line and lure, so that the fisherman can automatically stop the sinker and lure when the desired fishing depth is reached.

An object of this invention is to provide a reversible motor on the sinker line so that the sinker can be lowered with the motor running in one direction and automatically stopped when the desired fishing depth is reached, and raised with the motor running in the other direction and automatically stopped when the sinker is clear of the water.

A further object of this invention is to provide a speed control for the power reel to regulate the speed of the sinker and fishing tackle when they are being raised and lowered.

A further object of this invention is to mount a power sinker reel in cantilevered fashion on the free end of a downrigger pole with the opposite end of the pole adapted to be secured to a boat.

DESCRIPTION OF THE DRAWING

FIG. 1 is a elevational assembly view of the automatic power fishing reel mounted in cantilevered fashion on the line sinker pole showing the motor drive and reel support means attached to the pole, the automatic line regulator means attached to the pole adjacent the motor, and the motor speed control means attached to said pole adjacent said line regulator mechanism. The metal sinker line, sinker, and fishing line and lure are shown attached in operation in operative relationship to the automatic line regulator means.

FIG. 2 is a partial plan view of the down-stop reel means taken along line 2—2 of FIG. 1 showing the fishing line guide members and the down-stop switch means.

FIG. 3 is a sectional end view of the automatic fishing reel taken along line 3—3 of FIG. 1 showing the drive details, the metal line guide rollers, the up-stop means and the metal line guides.

FIG. 4 is a partial front view of the up-down switch means taken along line 4—4 of FIG. 5 showing the relationship of the switch to the up-down line control means.

FIG. 5 is a sectional view of the up-stop line regulating means taken along line 5—5 of FIG. 4.

FIG. 6 is a sectional view of the down-stop line regulating means taken along line 6—6 of FIG. 4.

FIG. 7 is a partial plan view of the up-stop line regulating means and the metal line guide means taken along line 7—7 of FIG. 1.

FIG. 8 is a sectional view of the line stop switch means taken along line 8—8 of FIG. 4.

DESCRIPTION OF THE PREFERRED EMBODIMENT

Referring now to the drawing wherein like numerals refer to like and corresponding parts throughout the several views, the automatic dual line power fishing reel 20 disclosed therein to illustrate the invention comprises an elongated downrigger cantilevered pole 21 having a free or cantilevered end 22 and a support end 23 having means including a bore 24 for securing same to a boat so that the end portion 22 extends outwardly therefrom.

A reel frame support means 24b including a support member 24a is provided with a pole bore 25 arranged to fit the cylindrical surface 26 of said pole, and fastening means or set screws 27 adjustably and fixedly secure said support member to said pole in selected relationship to the end thereof. As shown in FIG. 1 and FIG. 3 the support member is generally an L-shaped outline and vertical parallel walls or faces 28 and 29 extending upwardly and offset inwardly from said bore and horizontal walls 30 and 31 extending inwardly at right angles to said vertical faces.

The electric reversible driving motor means 32 is of conventional construction and has an internal worm 33 and gear 34 mounted in a casing 35. The casing is in turn fixedly mounted to vertical face 28 by screws 37 engaging the casing 35 and said reel support. A drive shaft 38 extends inwardly through drive shaft bore 39 with a substantial portion thereof protruding exteriorly of wall 29 for supporting and driving sinker line reel means 40. The drive shaft 38 is fixedly secured to said gear to rotate therewith. The worm 33 is driven in conventional manner by the motor means 32.

The sinker line reel means 40 is secured with the reel member lying substantially parallel and offset to the pole by virtue of the drive shaft bore being at right angles to and above the pole bore. The leg of the L or walls 30 and 31 extend underneath and generally central with the reel line side retaining edges 41 and 42 as shown in FIG. 1 and 7. The center portion of walls 30 and 31 is cut out to leave ears 43 and 44 to which are attached sinker line guide means including parallel spaced, generally horizontal rollers 45 and 46 having walls mounted on shafts 45 and 46 which are positioned longitudinally with the pole and line retaining edges 41 and 42 so that the line 78 passes through the opening defined by the rollers and is held in place by the rollers as it is reeled from the reel when the sinker is dropped. Clutch means 47 is provided to secure the reel to the drive shaft and to allow same to turn independently of the drive shaft as disclosed in my U.S. Pat. No. 4,077,582, issued Mar. 7, 1978, for DEEP SEA FISHING REEL.

As shown in FIG. 1 and 3 a fishing line guide means including an upper guide member 48 mounted to the motor casing and a lower guide member 48a mounted to the support adjacent the pole bore are vertically aligned generally centrally with the centerline of of the reel or pulley means 40 to direct the fishing line through the guide and stop eye 49 of the down-stop regulating means 50 which is likewise vertically aligned with the fishing line guide means.

My automatic line regulator switch means 51 is mounted on said pole adjacent the frame support means 24 and has a switch housing 52 having a longitudinal bore 53 and a set screw 54 for securing the housing adjustably and fixedly to said pole. A double pole, double throw switch member 55 is mounted on said housing above said bore and has a switch handle 56 protruding in exposed position outwardly from the housing and is arranged to be moved fore and aft to energize said motor to operate same in opposite directions.

A control plate 57 having a central opening 58 is mounted centrally over said switch handle or knob and has an undercut or vertical inner slot 59 extending sideways on each side of the knob. The central plate is attached to the switch housing by screws 60.

An elongated control arm 61 is positioned generally vertically in said slot and extends downwardly therefrom where it is secured at right angles to down-stop shaft member 62 by set screw 63. Shaft member 62 extends transversely through said switch housing through bore 63 and through the opposite side of 64 of said pole where to which the up-stop body 65 is adjustably and fixedly secured by set screws 66. The body 65 has legs 67 and 68 extending downwardly to which is attached a stop arm means 69 comprised of an elongated generally rectangularly outlined loop of wire 70 having its free ends 71 and 72 attached to said legs by set screws 74 and the loop portion 73 positioned substantially centrally and horizontally beneath said rollers, and spaced therefrom. A loop adjustment means 75 having an adjustment screw 76 engaging the switch housing 52 is integrally mounted on said up-stop body and movement of said screw regulates the position of the central arm 61 with respect to the switch knob.

The up-stop sinker line member 77 is fixedly located on the sinker line 78 a selected distance above the sinker 79 by means of clips 80 crimped to the sinker line as shown in FIG. 3 and the clips are larger than the line member bore 81 preventing the line stop member from moving along the line. Said sinker line stop member 77 has a cylindrical disc-like portion 82 which is larger in diameter than the width of the wire loop so that as the line is raised, the disc portion will engage the loop without passing therethrough, thereby actuating control arm 61.

As shown in FIGS. 1,4,5,6, and 8, the switch is off when it extends straight out from the housing as shown in FIG. 4, and the control arm 61 is held to the right of the slot 59 in non-engagement with the knob. When it is desired to raise the sinker, the switch is moved forwardly towards the end of the pole, and the motor is energized rotating the reel reeling in the sinker line and sinker. When the sinker line stop member 77 engages the loop member 73 the loop is moved upwardly causing the control arm to move counterclockwise wherein it engages the switch knob moving same from in position 83 to off position 84 de-energizing the motor and stopping the raising of the sinker.

The down-stop line regulating function is obtained by the operation of the down-stop line regulating means 85 which comprises the guide stop eye means 49 heretofore mentioned. The eye means is comprised of a partially open annular wire loop portion 86 having a handle portion 87 extending outwardly at right angles to said loop portion, and an elongated wire arm portion extending rearwardly of said eye portion where the central portion 88 is fixedly but adjustably mounted in a rotatable down-stop central arm support 89. The adjustable eye arm extends through said downstop arm support and the extended portion 90 is provided with a handle or knob 90a for manual operation. The down-stop control means 85 has an elongated central arm 91 which is mounted generally at right angles to said eye arm extends generally vertically into said vertical slot 59 rearwardly of said switch knob.

In normal switch-off position the down-stop control arm may lightly engage said switch knob without actuating said switch.

A flexible resilient stop member, such as a rubber tie 92 is detachably mounted, fastened or tied on said fishing line 92a at a point on the line adjacent the control eye where the desired fishing depth is first reached. Thereafter, when the fishing line is retrieved and again lowered by moving the switch to its forward position 93 thereby energizing said motor (FIG. 8), the resilient stop 92 releasably engages the control eye opening 49 in the downward mode pulling the eye arm downwardly and moving the down-stop control arm clockwise thereby moving said stop switch to off position 84 de-energizing the motor and stopping the sinker and lure at its predetermined depth.

The fishing line guide members 48 and 48a and the control eye are purposely left partially open so that after the sinker and line are deployed, the fishing line may be slipped out of the guide members and the control eye for fishing with the the fishing pole, line and lure, independently of the sinker regulating means. Said guide members are sufficiently larger than the control eye so that although the resilient member passes through the eye with sufficient resistance to actuate the down-stop control arm, it will readily pass through the guide members without rubbing thereon.

The fastening screw 94 operates to limit the movement of the up and down control arms to moving the switch from closed to open position only.

The down-stop support is rotatably mounted on shaft 95 which is fixedly mounted in turn at right angles to face 96 of the switch housing as disclosed in FIG. 6. A cotter pin 97 prevents said support from coming off said shaft.

Fastening means such as set screws, are used at all points necessary to secure the various parts of the device in operative condition.

Rearwardly of the switch housing, a motor speed control means 98, having a housing 98a, is positioned on said cantilevered pole adjacent the switch means 51 for regulating the speed of the motor in down movement of the tackle, the motor being reversible in operation by said switch means. The speed control means preferrably employs a rheostat 99 to vary the current from the source of electric energy 99a to the motor wiring 101.

Although the operation of the device has been explained in conjunction with the description, it may be summarized that it is now apparent that the depth of the sinker and lure can be regulated by my down-stop means as the resilient member engages the down-stop eye, and the upward movement of the sinker is regulated by the engagement of the up-stop member 77 with the loop when the member is raised. When a fish takes the bait, the sinker release 93a releases the sinker from the fishing line, and the fisherman moves the switch rearwardly energizing the motor in its upward mode causing the sinker to be reeled in. When the sinker stop member 77 engages the wire loop member 70 the down-stop control arm 61 is moved counterclockwise thereby moving the switch to off position stopping the motor and the sinker. The worm and gear mechanical advantage prevents the motor from unwinding by itself by the weight of the sinker. When the tackle is again lowered, the switch is moved forward by the knob or down-stop lever or arm means 85 and when the previous depth is reached by the sinker and tackle, the rubber tie releasably engages the control eye moving the control arm clockwise thereby moving the switch to off position stopping the motor and the downward descent of the sinker and tackle.

The entire operation of the device is enhanced by locating the sinker reel and the fishing line and sinker depth and height means on the free end of the cantilevered outrigger pole and the fish pole handle 102 holding socket 100 forwardly of the rheostat housing 98a allowing the greatest possible freedon from the necessity of manipulating the sinker control mechanism while fishing and playing a fish.

Many modifications may be made by those who desire to practice the invention without departing from the scope thereof, which is defined by the following claims:

I claim:

1. In trolling tackle, the combination comprising a fishing line, a sinker, a sinker release device connecting said sinker to said fishing line, a sinker line secured to the sinker for retrieving the sinker when it is released from the fishing line by said release device, a cantilevered pole having a free extremity, means for securing the end of the pole opposite said free extremity to a boat, reel means including a reel for the sinker line, power means for operating said sinker reel, means to secure the reel in an operative position on said pole adjacent the free extremity thereof, means to support a fishing pole for said fishing line inluding a fishing line guide member mounted adjacent said sinker reel for holding said fishing line in a selected position relative to said sinker line, means associated with said fishing line and sinker line for regulating the depth of said sinker, and means responsive to said fishing line for automatically de-energizing said depth regulating means when the sinker is lowered to a selected depth.

2. In trolling tackle, the combination comprising a fishing line, a sinker, a sinker release device connecting said sinker to said fishing line, a sinker line secured to the sinker for retrieving the sinker when it is released from the fishing line by said release device, a reel for the sinker line, power means for operating said reel, means associated with said fishing line for automatically de-energizing said power means stopping the fishing line and sinker at a selected depth, and means responsive to the sinker line operable to automatically de-energize said power means when the sinker has been retrieved to a selected height by the reel.

3. The combination as set forth in Claim 2 including an up-stop sinker member mounted on said sinker line, a sinker line guide having walls defining a sinker line retaining opening fixedly mounted adjacent and below said reel, and an up-stop arm member movably mounted adjacent and below said sinker line guide opening for de-energizing said power means, said opening walls arranged and adapted to position and steady the sinker line so that the sinker up-stop member engages the sinker up-stop arm when the sinker line is retrieved.

* * * * *